(12) United States Patent
van den Oord et al.

(10) Patent No.: US 11,870,947 B2
(45) Date of Patent: *Jan. 9, 2024

(54) GENERATING IMAGES USING NEURAL NETWORKS

(71) Applicant: DeepMind Technologies Limited, London (GB)

(72) Inventors: Aaron Gerard Antonius van den Oord, London (GB); Nal Emmerich Kalchbrenner, London (GB); Karen Simonyan, London (GB)

(73) Assignee: DeepMind Technologies Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/959,132

(22) Filed: Oct. 3, 2022

(65) Prior Publication Data
US 2023/0021497 A1 Jan. 26, 2023

Related U.S. Application Data

(63) Continuation of application No. 17/198,096, filed on Mar. 10, 2021, now Pat. No. 11,462,034, which is a
(Continued)

(51) Int. Cl.
*H04N 19/50* (2014.01)
*H04N 19/52* (2014.01)
(Continued)

(52) U.S. Cl.
CPC ......... *H04N 19/50* (2014.11); *G06F 18/2113* (2023.01); *G06N 3/04* (2013.01);
(Continued)

(58) Field of Classification Search
CPC ...... H04N 19/50; H04N 19/52; H04N 19/172; H04N 19/182; H04N 19/186;
(Continued)

(56) References Cited

U.S. PATENT DOCUMENTS 5,822,452 A * 10/1998 Tarolli .................... G06T 9/002
345/582
7,149,262 B1 * 12/2006 Nayar .................... G06T 3/4015
375/341
(Continued)

FOREIGN PATENT DOCUMENTS

JP 2004348732 12/2004
WO WO-2016132154 A1 * 8/2016 ............... G06K 9/46

OTHER PUBLICATIONS tinyclouds.org' [online] "Automatic Colorization," Jan. 2016 [retrieved on Oct. 3, 2017] Retrieved from Internet: URL=http://tinyclouds.org/colorize/> 13 pages.
(Continued)

*Primary Examiner* — Dominic D Saltarelli
(74) *Attorney, Agent, or Firm* — Fish & Richardson P.C.

(57) ABSTRACT

Methods, systems, and apparatus, including computer programs encoded on computer storage media, for generating images using neural networks. One of the methods includes generating the output image pixel by pixel from a sequence of pixels taken from the output image, comprising, for each pixel in the output image, generating a respective score distribution over a discrete set of possible color values for each of the plurality of color channels.

20 Claims, 6 Drawing Sheets

Related U.S. Application Data continuation of application No. 16/537,423, filed on Aug. 9, 2019, now Pat. No. 10,949,717, which is a continuation of application No. 15/721,089, filed on Sep. 29, 2017, now Pat. No. 10,402,700, which is a continuation-in-part of application No. PCT/US2017/014990, filed on Jan. 25, 2017.

(60) Provisional application No. 62/402,914, filed on Sep. 30, 2016, provisional application No. 62/286,915, filed on Jan. 25, 2016.

(51) Int. Cl.

| | |
|---|---|
| H04N 19/56 | (2014.01) |
| G06N 3/04 | (2023.01) |
| G06N 3/08 | (2023.01) |
| G06F 18/21 | (2023.01) |
| G06V 10/56 | (2022.01) |
| G06V 30/19 | (2022.01) |
| G06N 3/084 | (2023.01) |
| G06F 18/2113 | (2023.01) |
| G06N 3/044 | (2023.01) |
| G06N 3/045 | (2023.01) |
| G06V 30/194 | (2022.01) |
| H04N 19/186 | (2014.01) |
| H04N 19/172 | (2014.01) |
| H04N 19/182 | (2014.01) |

(52) U.S. Cl.
CPC ............ *G06N 3/044* (2023.01); *G06N 3/045* (2023.01); *G06N 3/08* (2013.01); *G06N 3/084* (2013.01); *G06V 10/56* (2022.01); *G06V 30/194* (2022.01); *H04N 19/52* (2014.11); *H04N 19/172* (2014.11); *H04N 19/182* (2014.11); *H04N 19/186* (2014.11)

(58) Field of Classification Search
CPC .. G06V 30/194; G06V 10/56; G06F 18/2113; G06N 3/045; G06N 3/044; G06N 3/04; G06N 3/08; G06N 3/084
USPC ................................................... 375/240.14
See application file for complete search history.

(56) References Cited

U.S. PATENT DOCUMENTS

| | | | | |
|---|---|---|---|---|
| 7,224,735 | B2* | 5/2007 | Porikli | G06V 10/24 375/240.26 |
| 8,660,345 | B1 | 2/2014 | Fang et al. | |
| 10,013,640 | B1* | 7/2018 | Angelova | G06V 10/454 |
| 10,051,253 | B1 | 8/2018 | Monastyrshyn | |
| 2004/0045030 | A1 | 3/2004 | Reynolds et al. | |
| 2005/0008193 | A1 | 1/2005 | Toyama | |
| 2013/0215264 | A1* | 8/2013 | Soatto | G06V 20/20 348/143 |
| 2015/0339572 | A1 | 11/2015 | Achin et al. | |
| 2016/0029031 | A1* | 1/2016 | Fahn | H04N 19/23 375/240.08 |
| 2018/0005047 | A1* | 1/2018 | Yu | G06N 3/045 |

OTHER PUBLICATIONS

'www.en.wikipedia.org' [online] "Super-resolution Imaging," Last Update Sep. 13, 2017, [retrieved on Oct. 2, 2017] Retrieved from Internet: URL<https://en.wikipedia.org/wiki/Super-resolution_imaging> 8 pages.

Chen et al., "Semantic image segmentation with deep convolutional nets and fully connected crfs," arXiv 1412.7062v4, Jun. 7, 2016, 14 pages.

De Brabandere et al., "Dynamic filter networks," arXiv 1605.09673v2, Jun. 6, 2016, 14 pages.

Dinh et al., "Nice: Non-Linear Independent components estimation," arXiv preprint arXiv 1410.8516v6, Apr. 10, 2015, 13 pages.

EP Communication pursuant to Article 94(3) EPC in European Appln. No. 17705215.6, dated Mar. 25, 2020, 7 pages.

EP Office Action in European Appln. No. 17790889.4, dated Aug. 21, 2020, 14 pages.

EP Office Action in European Appln. No. 17790889.4, dated May 14, 2021, 13 pages.

Finn et al., "Unsupervised Learning for physical internation through video prediction," arXiv 1605.07157v4, Oct. 17, 2016, 12 pages.

Germain et al., "MADE: Masked autoencoder for distribution estimation," arXiv preprint arXiv 1502.03509v2, Jun. 5, 2015, 10 pages.

Graves et al., "Offline handwriting recognition with multidimensional recurrent neural networks," Advances in Neural Information Processing Systems, 2009, 8 pages.

Graves, "Generating sequences with recurrent neural networks," arXiv preprint arXiv 1308.0850v5, Jun. 5, 2014, 43 pages.

Gregor et al., "Deep autoregressive networks," Proceedings of the 31st International Conference on Machine Learning, May 20, 2014, 9 pages.

Gregor et al., "DRAW: A recurrent neural network for image generation," Proceedings of the 32nd International Conference on Machine Learning, Feb. 16, 2015, 10 pages.

He et al., "Identity Mappings in Deep Residual Networks," ECCV 2016: Computer Vision—ECCV 2016, Lecture Notes in Computer Science, 2016, 9908:630-645.

He et al., "Deep residual learning for image recognition," arXiv preprint arXiv 1512.03385, Dec. 10, 2015, 12 pages.

He et al., "Identity mapping in deep residual networks," arXiv 1603.05027v3 Jul. 25, 2016, 15 pages.

Hochreiter et al., "Long short-term memory," Neural computation 9(8), Nov. 15, 1997, 46 pages.

International Search Report and Written Opinion issued in International Application No. PCT/US2017/014990, dated Apr. 28, 2017, 15 pages.

International Search Report and Written Opinion issued in International Application No. PCT/US2017/054528, dated Jan. 18, 2018, 18 pages.

JP Decision to Grant a Patent in Japanese Appln. No. 2018-558109, dated Sep. 30, 2019, 5 pages (with English translation).

Kalchbrenner et al., "Grid long short-term memory," arXiv preprint arXiv 1507.01526v3, Jan. 7, 2016, 15 pages.

Kalchbrenner et al., "Pixel recurrent neural networks," arXiv 1601.06759v3, Aug. 19, 2016, 11 pages.

Kalchbrenner et al., "Recurrent continuous translation models," Proceedings of the Conference on Empirical Methods in Natural Language Processing, Oct. 2013, 3(39): 10 pages.

Kalchbrenner et al., "Video Pixel Networks," ar Xiv preprint arXiv 1610.00527, Oct. 3, 2016, 16 pages.

Kingma et al., "Auto-encoding variational bayes," arXiv preprint arXiv 1312.6114v10, May 1, 2014, 14 pages.

KR Office Action in Korean Appln. No. 10-2018-7024508, dated Apr. 8, 2020, 8 pages (with English translation).

Larochelle et al., "The neural autoregressive distribution estimator," Proceedings of the Fourteenth International Conference on Artificial Intelligence and Statistics, Jun. 14, 2011, 9 pages.

Mansimov et al., "Generating Images from Captions with Attention," arXiv 1511.02793v2, Feb. 29, 2016, 12 pages.

Mathieu et al., " Deep Multi-scale video prediction beyond mean square error," arXiv 1511.05440v6, Feb. 26, 2016, 14 pages.

Murray et al., "Evaluating probabilities under high-dimensional latent variable models," Advances in Neural Information Processing Systems, 2009, 8 pages.

Neal, "Connectionist learning of belief networks," Artificial intelligence, 56(1) Jul. 1, 1992, 43 pages.

Oh et al., "Action-Conditional Video Prediction using Deep Networks in Atari Games," CoRR, Dec. 2015, https://arxiv.org/pdf/1507.08750.pdf, 26 pages.

(56) References Cited

OTHER PUBLICATIONS

Oh et al., "Action-conditional video prediction using deep networks in Atari games," Advances in Neural Information Processing Systems, Dec. 2015, 9 pages.
Patraucean et al., "Spatio-temporal video autoencoder with differentiable memory," arXiv1511.06309v5, Sep. 1, 2016, 13 pages.
PCT International Preliminary Report on Patentability in International Appln No. PCT/US2017/054528, dated Apr. 11, 2019, 12 pages.
Raiko et al., "Iterative neural autoregressive distribution estimator NADE-k," Advances in Neural Information Processing Systems, 2014, 9 pages.
Ranzato et al., "Video (language) modeling: a baseline for generative models of natural videos," arXiv 1412.6604v5, May 4, 2016, 15 pages.
Rezende et al., "Stochastic backpropagation and approximate inference in deep generative models," arXiv 1401.4082v3, May 30, 2014, 14 pages.
Salakhutdinov et al., "Deep Boltzmann machines," Artificial Intelligence and Statistics, Apr. 15, 2009, 8 pages.
Salimans et al., "Markov chain monte carlo and variational inference: Bridging the gap," Proceedings of the 32nd International Conference on Machine Learning, 2015, 9 pages.
Sohl-Dickstein et al., "Deep unsupervised learning using nonequilibrium thermodynamics," arXiv preprint arXiv 1503.03585v8, Nov. 18, 2015, 18 pages.
Srivastava et al., "Highway networks," arXiv 1505.00387v2, Nov. 3, 2015, 6 pages.
Srivastava et al., "Unsupervised learning of video representations using lstms," International Conference on Machine Learning, Jun. 1, 2015, 37:10 pages.
Stollenga et al., "Parallel multi-dimensional lstm, with application to fast biomedical volumetric image segmentation," Advances in Neural Information Processing Systems 28, 2015, 9 pages.
Sutsekever et al., "Generating text with recurrent neural networks," Proceedings of the 28th International Conference on Machine Learning, 2011, 8 pages.
Theis et al., "A note of the evaluation of generative models," arXiv preprint ar Xiv 1511.01844v3, Apr. 24, 2016, 10 pages.
Theis et al., "Generative Image Modeling Using Spatial LSTM's," arXiv 1506.03478 Sep. 18, 2015, 9 pages.
Uria et al., "A deep and tractable density estimator," Proceedings of the 31st International Conference on Machine Learning, Jan. 27, 2014, 9 pages.
Uria et al., "RNADE: The real-valued neural autoregressive density-estimator," Advances in Neural Information Processing Systems, 2013, 9 pages.
Van den Oord et al., "Pixel Recurrent Neural Networks," CoRR, Jan. 2016, https://arxiv.org/pdf/1601.06759.pdf, 11 pages.
Van den Oord et al., "Conditional Image Generation with PixelCNN decoders," Advances in Neural Information Processing Systems, 2016, 9 pages.
Van den Oord et al., "Factoring variations in natural images with deep Gaussian mixture models," Advances in Neural Information Processing Systems, 2014, 9 pages.
Van den Oord et al., "Pixel Recurrent Neural Networks," arXiv preprint arXiv 1601.06759, Jan. 25, 2016, 10 pages.
Van den Oord et al., "The Student-t Mixture as a Natural Image Patch Prior with Application to Image Compression," Journal of Machine Learning Research, Jun. 2014, 15:26 pages.
Van den Oord et al., "Wavenet: A generative model for raw audio," arXiv 1609.03499, Sep. 19, 2016, 15 pages.
Vondrick et al., "Generating videos with scene dynamics," Advances in Neural Information Processing Systems, 2016, 9 pages.
Written Opinion issued in International Application No. PCT/US2017/014990, dated Jan. 11, 2018, 8 pages.
Xingjian et al., "Convolutional LSTM network: A machine learning approach for precipitation nowcasting," Advances in neural information processing systems, 2015, 9 pages.
Yu et al., "Multi-scale context aggregation by dilated convolutions," arXiv 1511.07122v3, Apr. 30, 2016, 13 pages.
Zhang et al., "Highway long short-term memory RNNs for distance speech recognition," Proceedings of the International Conference on Acoustics, Speech and Signal Processing, Mar. 2016, 5 pages.
Zoran et al., "From Learning Models of Natural Image Patches to Whole Image Restoration," IEEE International Conference on Computer Vision, Nov. 6, 2011, 8 pages.

\* cited by examiner

GENERATING IMAGES USING NEURAL NETWORKS

CROSS-REFERENCE TO RELATED APPLICATIONS

This application is a continuation of U.S. application Ser. No. 17/198,096, filed Mar. 10, 2021, which is a continuation of U.S. application Ser. No. 16/537,423, filed Aug. 9, 2019, which is a continuation of U.S. application Ser. No. 15/721,089, filed on Sep. 29, 2017, which claims priority to U.S. Provisional Application No. 62/402,914, filed on Sep. 30, 2016, and this application is a continuation-in-part of and claims priority to PCT Application No. PCT/US2017/014990, filed on Jan. 25, 2017, which claims priority to U.S. Provisional Application No. 62/286,915, filed on Jan. 25, 2016. The disclosures of the prior applications are considered part of and are incorporated by reference in the disclosure of this application.

BACKGROUND

This specification relates to generating images using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step.

An example of a recurrent neural network is a Long Short-Term Memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes how a system implemented as computer programs on one or more computers in one or more locations can generate an output image from a neural network input or generate a predicted video frame from a sequence of video frames.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Particular embodiments of the subject matter described in this specification can be implemented so as to realize one or more of the following advantages.

A neural network system as described in this specification can more accurately generate images from neural network inputs. In particular, by modeling the color values for the pixels in output images as discrete rather than continuous values, training of the neural network can be improved, i.e., the neural network can be trained more quickly, and the quality of the output images generated by the trained neural network can be increased. By generating the output image pixel by pixel and color value by color value, i.e., so that the color value for a given color channel for a given pixel is conditioned on both color values for earlier pixels and any earlier color channels within the given pixel, the quality of output images that are generated can be improved. By generating the image in this manner using the neural network system described in this specification, the neural network can capture the full generality of pixel inter-dependencies without introducing independence assumptions that have been necessary in existing models. The system can effectively condition the generated images on desired features without greatly increasing the computational capacity of the system.

When generating video frames, the video frame generation system as described in this specification can achieve results that outperform the state of the art in accurately predicting the next video frame in a video from the currently seen video frames. In particular, the system can achieve these results because the model and the neural architecture reflect the time, space and color structure of video tensors and encode it as a four-dimensional dependency chain. The factorization of the dependency further ensures that the model stays fully tractable; the likelihood that the model assigns to a video can be computed exactly. The model operates on pixels without preprocessing and predicts discrete multinomial distributions over raw pixel intensities, allowing the model to estimate distributions of any shape. In particular, the system can achieve these state of the art results without using any specific motion priors or any surrogate losses. Because of the architecture and the dependencies, the system generates video frames that are free of artifacts and are highly detailed for many frames into the future, i.e., by continuing to append frames generated by the system to the end of temporal sequences to generate more frames. Additionally, the video frame generation system can be configured to effectively condition predicted next video frames on actions performed by a robotic agent that is interacting with an environment. After training, the video frame generation system can effectively generalize to the motion of novel objects, i.e., can generate video frames that accurately predict the motion of novel objects not encountered during the training. Because of the architecture of the encoder neural network and the decoder neural network, certain operations performed by the system can be parallelized during training so that fewer computational resources are required to train the neural networks.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
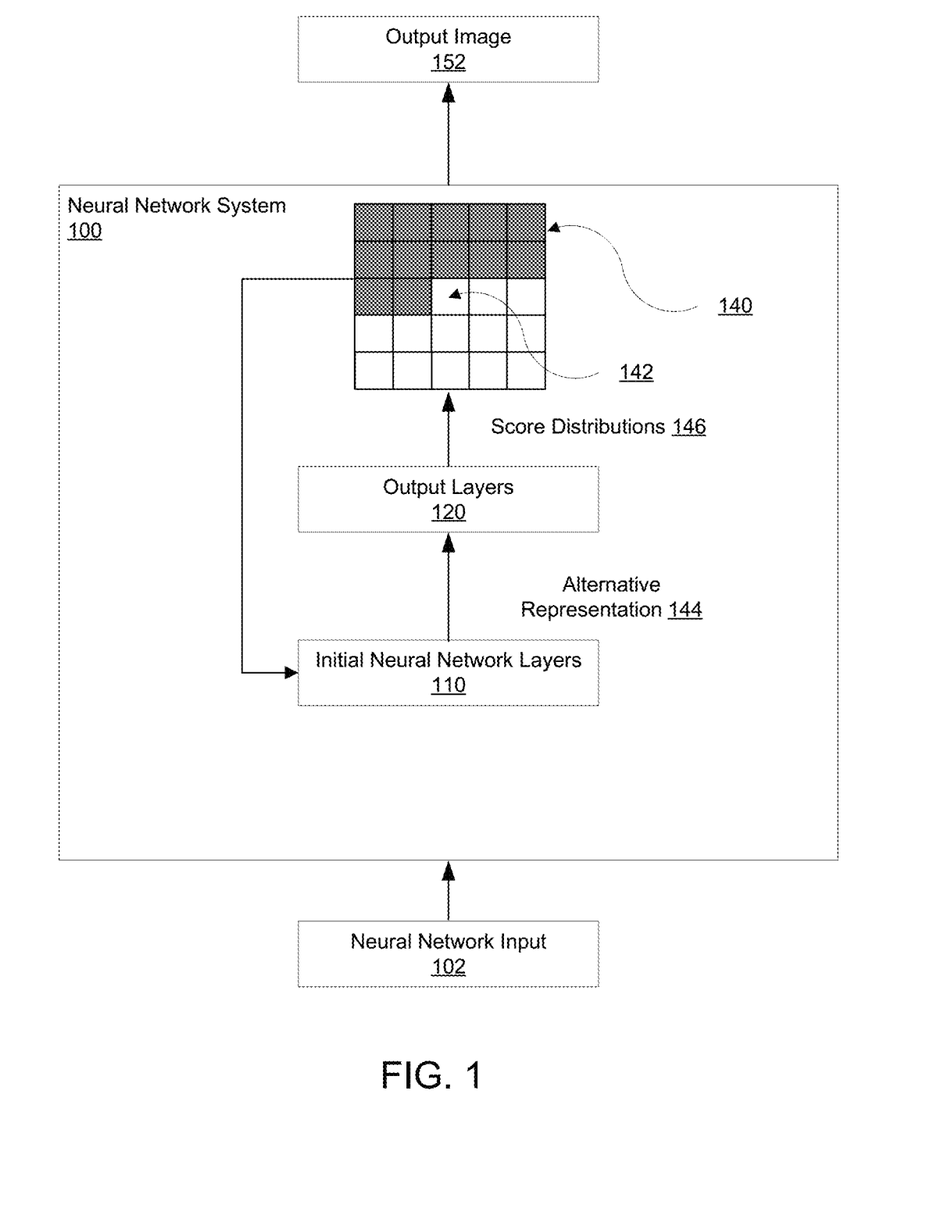
FIG. 1 shows an example neural network system.

FIG. 1 shows an example neural network system 100. The neural network system 100 is an example of a system implemented as computer programs on one or more computers in one or more locations, in which the systems, components, and techniques described below can be implemented.

The neural network system 100 receives a neural network input and generates an output image from the neural network input. For example, the neural network system 100 can receive a neural network input 102 and generate an output image 152 from the neural network 102.

In some implementations, the neural network system 100 can be used for lossless compression of images or for generating new images that have similar features to images on which the system was trained.

In particular, for lossless compression, the neural network input can be an image and the neural network system 100 may generate an output image that is a reconstruction of the input image.

The neural network system 100 can then store at least a portion of the score distributions generated by the output layers of the neural network system 100 as described below for use in arithmetic encoding of the image. An example technique for using score distributions generated by a machine learning model for arithmetic encoding and decoding is described in Aaron van den Oord and Benjamin Schrauwen, The Student-t Mixture as a Natural Image Patch Prior with Application to Image Compression, available at http://www.jmlr.org/papers/volume15/vandenoord14a/vandenoord14a.pdf.

For image generation, during training, the neural network input can be an image and the neural network system 100 may generate an output image that is a reconstruction of the input image.

After training, the neural network system 100 may generate an output image pixel by pixel without being conditioned on an input.

In particular, for a given input, the neural network system 100 generates an output image that includes a predetermined number of pixels arranged in a two-dimensional map, with each pixel having a respective color value for each of multiple color channels. For example, the neural network system 100 can generate images that include a red color channel, a green color channel, and a blue color channel. As a different example, the neural network system 100 can generate images that include a cyan color channel, a magenta color channel, a yellow color channel, and a black color channel. The multiple color channels are arranged according to predetermined order, e.g., red, green, and then blue, or blue, red, and then green.

Generally, the neural network system 100 generates the color values in the output image pixel by pixel in a sequence of pixels taken from the output image. That is, the neural network system 100 orders the pixels in the output image into a sequence and then generates the color values for each pixel in the output image one by one in order according to the sequence.

For example, the sequence may start at the top left corner of the output image and proceed row by row through the output image, with the last pixel in the sequence being the pixel in the bottom right corner of the output image. In this example, the neural network system 100 first generates the color values for the top left corner pixel and then proceeds to the next pixel in the top row of the image.

In particular, for a given color channel of a given pixel in the output image, the neural network system 100 generates the color value for the color channel of the given pixel conditioned on (i) color values for pixels before the pixel in the sequence and (ii) color values for the pixel for any color channels before the color channel in the order of color channels. During training or for image compression, because the output image is a reconstruction of the neural network input, i.e., the input image, these color values can be taken from the corresponding pixels in the input image rather than from the output image.

In particular, the neural network system 100 includes one or more initial neural network layers 110 and one or more output layers 120.

After a given color value for a given color channel of a given pixel in the output image has been generated, the initial neural network layers 110 are configured to process the current output image, i.e., the output image that includes the color values that have already been generated for the output image, to generate an alternative representation of the current output image.

For example, the initial neural network layers 110 can process a current output image 140 to generate an alternative representation 142 of the current output image 140.

As shown in FIG. 1, the shaded portion of the current output image 140 denotes pixels for which color values have already been generated by the neural network system 100, while the unshaded portion of the current output image 140 denotes pixels for which color values have not already been generated.

The one or more output layers 120 receive the alternative representation and generate a score distribution over a discrete set of possible color values for the next color channel in the image. For example, the discrete set of possible color values can be the set of integers from zero to two hundred fifty-five, inclusive, with the score distribution including a respective score for each of the integers in the set. The scores in the score distribution can represent, for each possible pixel value, the likelihood, e.g., the probability, that the pixel value should be the value of the given color channel for the task that the system is configured to perform.

If the given color channel referenced above is the last color channel in the predetermined ordering of color channels, the output layers 120 generate a score distribution for the first color channel in the next pixel in the sequence after the given pixel. In the example of FIG. 1, the output layers 120 generate a score distribution 146 for the first color channel of a next pixel 142 in the output image 140.

If the given color channel referenced above is not the last color channel in the predetermined ordering, the output layers 120 generate a score distribution for the next color channel after the given color channel in the order of color channels for the given pixel. For example, if the order of the color channels is red, green, and then blue and the last color value generated was for the green color channel of the given pixel, the score distribution generated by the output layers 120 is the score distribution for the blue color channel of the given pixel.

In some implementations, the neural network system 100 includes a single output layer, e.g., a single softmax layer, that generates the score distributions for all of the color channels.

In some other implementations, the neural network system 100 includes a respective output layer, e.g., a respective softmax layer, corresponding to each of the color channels, and each output layer generates the score distribution for the corresponding color channel.

In some implementations and as described in more detail below, the alternative representation is a feature map that includes features for each color channel of each pixel in the output image. In these implementations, when generating the color value for a given channel of a given pixel, the output layer uses the corresponding portion of the alternative representation, i.e., uses the portion of the alternative representation that includes the features of the given color channel of the given pixel.

The neural network system 100 then selects a value for the current color channel, i.e., either the first color channel in the next pixel in the sequence after the given pixel or the next color channel after the given color channel in the order of color channels for the given pixel, from the generated score distribution. For example, the neural network system 100 can sample a color value in accordance with the score distribution or select the highest-scoring color value according to the score distribution.

The initial neural network layers 110 can be configured in any of a variety of ways to allow the layers 110 to generate the alternative representation conditioned on the current output image, i.e., and not on any color values in the output image that have yet to be generated by the neural network system 100.

In some implementations, the initial neural network layers 110 are a fully convolutional neural network that is made up of multiple convolutional neural network layers that each preserve the spatial resolution of the input to the initial neural network layers 110. That is, the spatial resolution of the input to the initial neural network layers 110 and the output of each of the convolutional neural network layers have the same spatial resolution, i.e., have the same number of pixels as the output image, while the number of features generated for each pixel by the convolutional neural network layers can vary.

However, throughout the processing, the features for each input position, i.e., at each pixel, at every layer in the network are split into multiple portions, with each corresponding to one of the color channels.

Thus, the alternative representation generated by the initial neural network layers 110 includes a respective portion for each of the color channel values for the given pixel, and, when generating the score distribution for a given color channel, the output layers 120 are configured to process the portion corresponding to the given color channel.

To ensure that the convolutional neural network layers are conditioned only on the already generated output values, each convolutional neural network layer is configured to apply a convolution that is masked such that the portion of the alternative representation corresponding to a given color channel for a given pixel is only generated based on (i) pixels in the output image that are before the pixel in the sequence and (ii) color channel data for the pixel for color channels before the given color channel in the order of color channels.

For the first convolutional layer, i.e., the layer that receives the current output image as input, the mask restricts the connections to a given pixel in the output feature map of the first convolutional layer to those neighboring pixels in the current output image that are before the given pixel in the sequence and to those colors in the corresponding pixel in the current output image that have already been generated.

For additional convolutional layers, the mask restricts the connections in a given pixel in the output feature map of the additional convolutional layer to those neighboring pixels in the input feature map to the additional convolutional layer that are before the given pixel in the sequence, to features corresponding to those colors in the corresponding pixel in the input feature map that have already been generated, and to features corresponding to the given color in the corresponding pixel in the input feature map.

The neural network system 100 can implement this masking in any of a variety of ways. For example, each convolutional layer can have a kernel with the corresponding weights zeroed out.

In some cases, the initial neural network layers 110 include two stacks of convolutional neural network layers: a horizontal one that, for a given pixel in a given row, conditions on the color values already generated for the given row so far and a vertical one that conditions on all rows above the given row. In these cases, the vertical stack, which does not have any masking, allows the receptive field to grow in a rectangular fashion without any blind spot, and the outputs of the two stacks are combined, e.g., summed, after each layer.

In some other implementations, the initial neural network layers 110 include multiple LSTM layers that are arranged in a stack one after the other. Like the convolutional neural network layers, the LSTM layers preserve the spatial dimensions of the input and the features generated by each LSTM layer for each input position at every layer in the network are split into multiple portions, with each corresponding to one of the color channels.

Each of these LSTM layers apply convolutions to the input feature map to the LSTM layer, i.e., the hidden state of the preceding LSTM layer or the current output image, to generate an input-to-state component and apply convolutions to the previous hidden state of the layer to generate a state-to-state-component. The LSTM layer then generates the values of the gates for the LSTM layer from the input-to-state component and the state-to-state component and generates the updated hidden state and the updated cell state for the layer from the gate values and the preceding cell state.

In some of these implementations, the LSTM layers are row LSTM layers that process an input feature map row by row from top to bottom computing features for a whole row at once.

That is, for each row of the input feature map, a row LSTM layer is configured to compute an input-to-state component of the row LSTM layer for the entire input feature map, e.g., using a one-dimensional convolution, and, after computing the input-to-state component for the entire input feature map, use the input-to-state component in processing the input feature map row by row from top to bottom computing features for a whole row at once.

To ensure that the row LSTM layers do not condition outputs on color values that have not already been generated, the convolution used by the row LSTM layer to generate the input-to-state component is masked as described above for the convolutional neural network layers.

In others of these implementations, the LSTM layers are diagonal bidirectional LSTM (BiLSTM) layers.

Generally, a bidirectional LSTM layer is configured to generate an output map for one direction and an output map for another direction and to combine the two output maps to generate the final output map for the layer. That is, the bidirectional LSTM layer computes state-to-state and input-to-state components for each of the two directions and then generates the output map for each direction from the state-to-state and input-to-state components for that direction.

In particular, each diagonal BiLSTM layer is configured to scan an input feature map in diagonal fashion along a first direction and in diagonal fashion along a second direction to generate the output feature map of the layer.

More specifically, each diagonal BiLSTM layer is configured to skew the input feature map into a space that allows for easily applying convolutions along diagonals, e.g., by offsetting each row in the input feature map by one position with respect to the previous row.

For each of the two directions, the diagonal BiLSTM layer is then configured to compute the input-to-state component for the diagonal biLSTM layer for the direction by applying a 1×1 convolution to the skewed input feature map and compute a state-to-state component of the diagonal biLSTM layer for the direction by applying a column-wise convolution to the skewed input feature map. In some implementations, the column-wise convolution has a kernel of size 2×1.

The diagonal BiLSTM layer is further configured to generate a skewed output feature map for each direction, e.g., a left skewed output feature map and a right skewed output feature map, from the state-to-state and input-to-state components for the direction as described above and to skew each skewed output feature map back to match the spatial dimensions of the input feature map by removing the offset positions. The diagonal BiLSTM layer then shifts the right output map down by one row and adds the shifted right output map to the left output map to generate the final output map for the layer.

As with the row LSTM layers, the convolutions applied by the diagonal BiLSTM layers to generate the state-to-state components may also be masked as described above.

In some implementations, the initial neural network layers 110 include a first convolutional layer that receives the current output image as input and for which the mask restricts the connections to a given pixel in the output feature map of the first convolutional layer to those neighboring pixels in the current output image that are before the given pixel in the sequence and to those colors in the corresponding pixel in the current output image that have already been generated followed by one or more row LSTM layers or one or more diagonal BiLSTM layers.

In some implementations, the initial neural network layers 110 include skip connections between layers, residual connections between layers, or both. When the initial neural network layers 110 include two stacks of convolutional layers, only the horizontal stack may include the residual and/or skip connections.

In some implementations, when the initial neural network layers 110 are convolutional layers, some or all of the layers have a gated activation function in place of a conventional activation function. In a gated activation function, the output of an element-wise non-linearity, i.e., of a conventional activation function, is element-wise multiplied by a gate vector that is generated by applying an element-wise non-linearity to the output of a convolution.

More specifically, when the element-wise non-linearity is tanh and the element-wise gating function is the sigmoid function, the output of the activation function z for a layer k satisfies:

$$z=\tanh(W_{f,k}*x)\odot\sigma(W_{g,k}*x),$$

where $W_{f,k}$ is the main filter for the layer k, x is the layer input, * denotes a convolution, $\odot$ denotes element-wise multiplication, and $W_{g,k}$ is the gate filter for the layer k.

In some implementations, the neural network input can include a high-level description of the desired content of the generated image that is represented as a latent vector.

That is, in some implementations, the generated image is conditioned on a latent vector. For example, the latent vector may be a one-hot encoding or other representation that specifies a class of object that should appear in the generated image.

When the output image being generated is conditioned on a latent vector, some or all of the convolutional layers also condition the output of the activation function on the neural network input.

In particular, the non-linear function and the gating function each take as input a combination of the corresponding convolution output and an input generated from the latent vector.

More specifically, when the element-wise non-linearity is tanh and the element-wise gating function is the sigmoid function, the output of the activation function z for the layer k satisfies:

$$z=\tanh(W_{f,k}*x+V_{f,k}^T h)\odot\sigma(W_{g,k}*x+V_{g,k}^T h),$$

where $V_{f,k}^T$ is a main learnable linear projection (of h to the main component of the activation function) for the layer k, h is the latent vector, and $V_{f,k}^T$ is a gate learnable linear projection (of h to the gate component of the activation function) for the layer k.

In some cases, the conditioning may be location dependent. That is, the conditioning vector may be different for different locations in the output image. For example, in some cases, the desired object should only appear in a certain portion of the image or different objects should appear in different portions of the image. In these cases, the system 100 obtains a spatial representation s of the conditioning input that has the same width and height as the image but may have an arbitrary number of feature maps. The output of the activation function z for the layer k then satisfies:

$$z=\tanh(W_{f,k}*x+V_{f,k}*s)\odot\sigma(W_{g,k}*x+V_{g,k}*s),$$

where $V_{f,k}*s$ and $V_{g,k}*s$ are respective 1×1 convolutions. In some cases, the system 100 directly receives s. In other implementations, the system 100 receives a respective h for each pixel in the image and generates s using a deconvolutional network.

Figure 2:
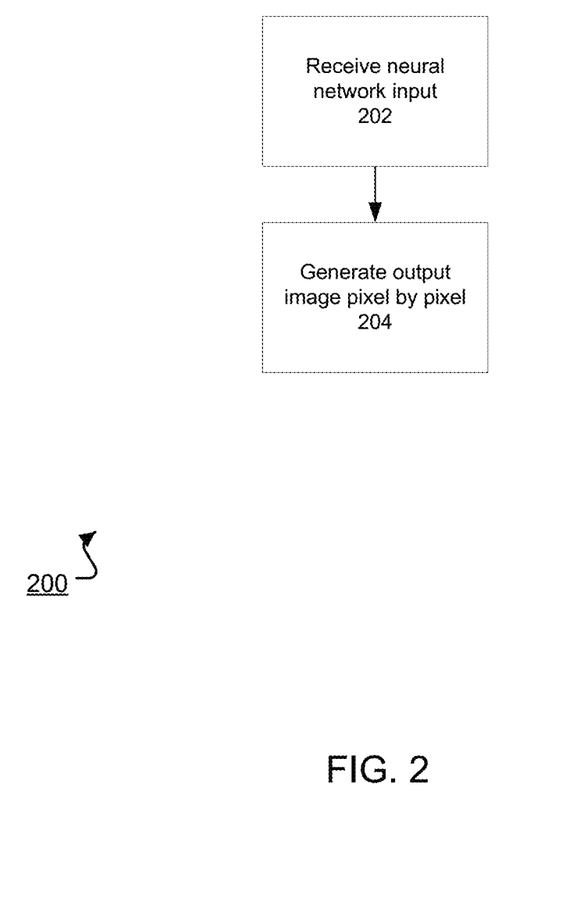
FIG. 2 is a flow diagram of an example process for generating an output image from a neural network input.

FIG. 2 is a flow diagram of an example process 200 for generating an output image from a neural network input. For convenience, the process 200 will be described as being performed by a system of one or more computers located in one or more locations. For example, a neural network system, e.g., the neural network system 100 of FIG. 1, appropriately programmed, can perform the process 200.

The process 200 can be performed during training of the neural network to generate output images. For example, the process 200 can be a forward pass of the training process. The process 200 can also be performed as part of compressing the neural network input, i.e., the input image.

The system receives a neural network input (step 202). As described above, the neural network input may be an input image.

The system generates an output image from the neural network input pixel by pixel in a sequence of pixels taken from the output image (step 204). That is, the system generates the color values for each pixel in the output image one by one in order according to the sequence, so that color values for pixels earlier in the sequence are generated before color values later in the sequence. Within each pixel, the system generates the color values for the color channels of the pixel one by one according to the predetermined order of the color channels. In particular, the system generates each color value for each pixel conditioned on (i) color values for pixels for pixels before the pixel in the sequence and (ii) color values for the pixel for any color channels before the color channel in the order of color channels. During training or for image compression, because the output image is a reconstruction of the neural network input, i.e., the input image, these color values can be taken from the corresponding pixels in the input image rather than from the output image.

Figure 3:
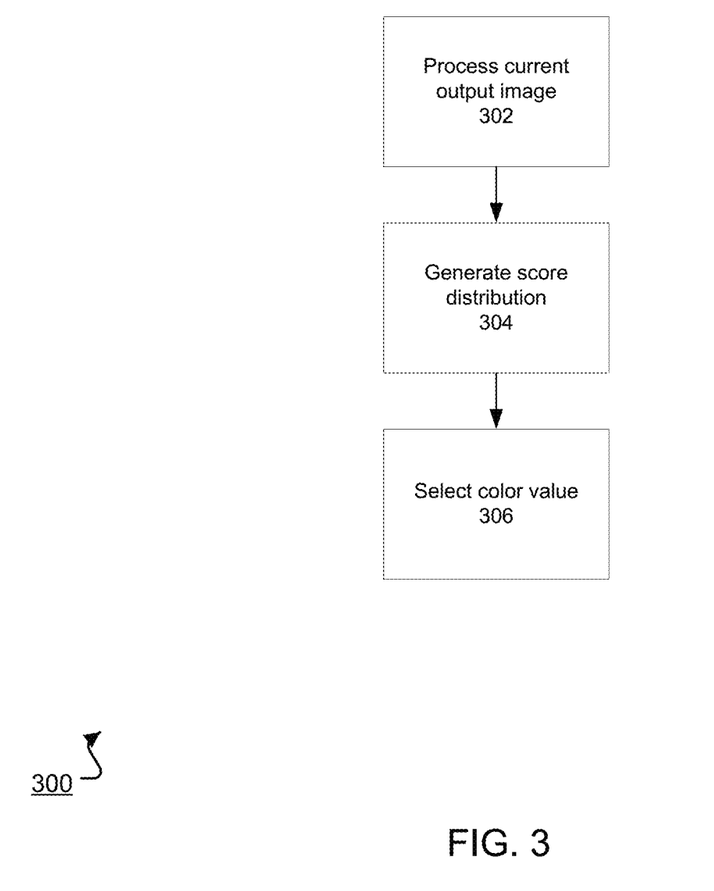
FIG. 3 is a flow diagram of an example process for generating a color value for a given color channel for a given pixel in an output image.

FIG. 3 is a flow diagram of an example process 300 for generating a color value for a given color channel of a given pixel of an output image. For convenience, the process 300 will be described as being performed by a system of one or more computers located in one or more locations. For example, a neural network system, e.g., the neural network system 100 of FIG. 1, appropriately programmed, can perform the process 300.

The system processes a current output image through the initial neural network layers to generate an alternative representation (step 302). The current output image is the image that includes color values for each of the color channels for the pixels before the given pixel in the sequence and color values for any color channels before the given color channel in the order for the given pixel. As described above, the initial neural network layers are configured to apply convolutions that are masked so that the alternative representation is conditioned on the already generated color values and not on any color values that have yet to be generated.

The alternative representation includes a respective portion corresponding to each of the color channels of the given pixel.

The system processes the portion of the alternative representation corresponding to the given color channel using the output layer, e.g., the softmax layer, corresponding to the given color channel to generate a score distribution over the possible color values for the given color channel (step 304). As described above, in some implementations a single output layer corresponds to all of the color channels while in other implementations each color channel has a different corresponding output layer.

The system selects a color value for the given color channel of the given pixel using the score distribution (step 306), e.g., by selecting the highest-scoring color channel or by sampling from the score distribution.

The system can repeat the process 300 for each color channel of each pixel in the output image to generate color values for each pixel in the output image.

The system can perform the processes 200 and 300 for neural network inputs for which the desired output, i.e., the output image that should be generated by the system for the input, is not known.

The system can also perform the processes 200 and 300 on neural network inputs in a set of training data, i.e., a set of inputs for which the output image that should be generated by the system is known, in order to train the initial neural network layers and, if the output layers have parameters, the output layers, i.e., to determine trained values for the parameters of the initial neural network layers and, optionally, the output layers. The processes 200 and 300 can be performed repeatedly on inputs selected from a set of training data as part of a conventional machine learning training technique to train the initial neural network layers, e.g., a stochastic gradient descent with backpropagation training technique.

During training, because the output image that should be generated is known in advance, the computations performed by the initial neural network layers can be accelerated to reduce the amount of time and computing resources necessary to process a given training neural network input and, therefore, to decrease the time required for training, to improve the performance of the trained neural network, or both.

For example, when the initial neural network layers are a fully convolutional neural network, the processing necessary for the initial neural network layers to generate the alternative representations can be done in parallel rather than sequentially because the entire output image is available from the beginning of the computation. That is, as described above, the system can use color values for the input image in place of already generated output image pixel color values. Because the convolutions are masked, the system can generate the entire alternative representation in parallel based on the input image.

In some cases, the neural networks described above can be used as a decoder neural network in a system that generates predicted video frames that follow the last video frame in an input video frame sequence. Examples of such systems are described below with reference to FIGS. 4-6.

Figure 4:
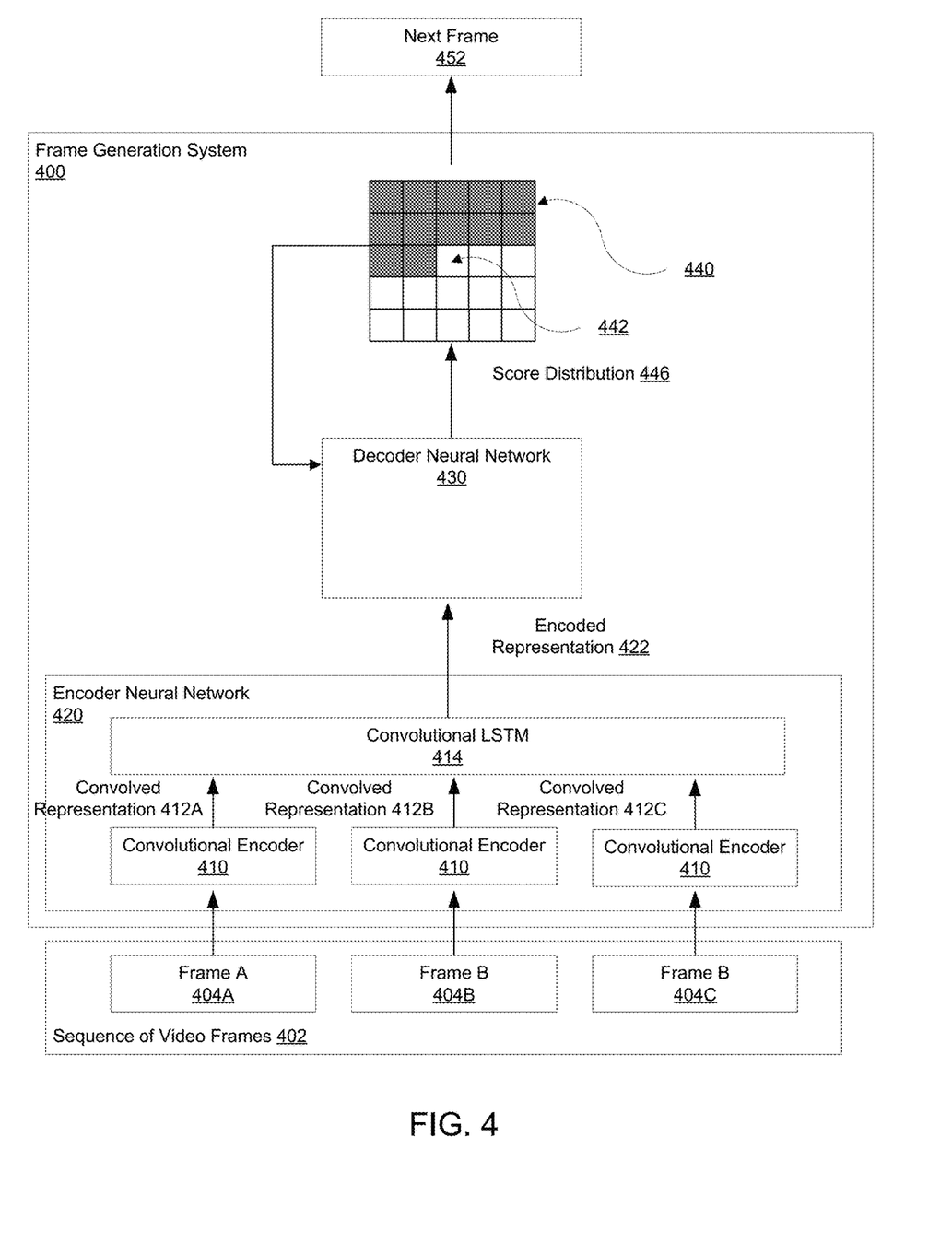
FIG. 4 shows an example video frame generation system.

FIG. 4 shows an example video frame generation system 400. The video frame generation system 400 is an example of a system implemented as computer programs on one or more computers in one or more locations, in which the systems, components, and techniques described below can be implemented.

The video frame generation system 400 receives a temporal sequence of video frames and generates a predicted video frame that is a prediction of the next video frame in the sequence, i.e., the video frame that will follow the last video frame in the temporal sequence of video frames. The sequence of video frames is referred to in this specification as a temporal sequence because the video frames in the sequence are ordered according to the time at which the frames were captured.

For example, the video frame generation system 400 can receive a video frame sequence 402 and generate a next frame 452 that is a prediction of the next video frame in the video frame sequence 402.

In particular, as will be described in more detail below, the predicted next video frame 452 generated by the system 400 includes multiple pixels, with each pixel having a respective color value for each of multiple color channels, and the pixels being ordered according to a pixel order and the color channels being ordered according to a channel order. The pixel order and the channel order can be configured, e.g., by a system designer, and various orderings of the pixels in the frame and the channels are possible.

The frame generation system 400 includes an encoder neural network 420 that is configured to process each video frame in the temporal sequence to generate an encoded representation of the temporal sequence and a decoder neural network 430 that is configured to generate the next frame from the encoded representation.

For example, the encoder neural network 420 can process the frame sequence 402 to generate an encoded representation 422 and the decoder neural network 430 can process the encoded representation 422 to generate the next frame 452.

In particular, the encoder neural network 420 can include a convolutional encoder sub-neural network 410 followed by a convolutional long short-term memory (LSTM) sub-neural network 414.

The convolutional encoder sub-neural network 410 is configured to receive an input video frame and to process the input video frame to generate a convolved representation of the input video frame that preserves the resolution of the video frame. That is, the convolved representation has the same spatial dimensions as the input video frame but may include a different number of channels from the input video frame.

Generally, the convolutional encoder sub-neural network 410 includes multiple resolution-preserving convolutional neural network layers. In some cases, the convolutional neural network layers in the convolutional encoder 410 are arranged into multiple residual blocks. A residual block of convolutional neural network layers is a block of layers that has a residual (additive skip) connection from the input to the block to the output of the block. Generally, residual blocks allow for easy gradient propagation through many layers of a neural network.

In some cases, some or all of the residual blocks are residual multiplicative blocks that include convolutional layers arranged into one or more multiplicative units. A multiplicative unit includes multiple convolutional layers that are each applied to the input to the multiplicative unit, e.g., in parallel.

Residual multiplicative blocks, multiplicative units, and example architectures for the convolutional encoder 410 are described in more detail below with reference to FIG. 2.

The system 400 processes each frame in the input video sequence using the convolutional encoder 410 to generate a respective convolved representation for each of the frames. For example, the system 400 can process video frames 404A-C from the video sequence 402 using the convolutional encoder 410 to generate respective convolved representations 412A-C.

The convolutional LSTM 414 is configured to receive the convolved representations for the video frames in the sequence and to process the convolved representations in sequence to generate the encoded representation of the temporal sequence. Generally, the encoded representation also preserves the resolution of the video frames in the temporal sequence. However, the encoded representation may have a different number of channels than both the convolved representations and the input frame.

For example, the convolutional LSTM 414 can receive the convolved representations 412A-C and process the convolved representation 412A-C to generate the encoded representation 422.

Generally, the convolutional LSTM 414 is a recurrent neural network that has convolutional gates and the encoded representation of the input sequence is the output of the convolutional LSTM 414 after processing the convolved representation of the last video frame in the input sequence. Convolutional LSTMs are described in more detail in Xingjian Shi, Zhourong Chen, Hao Wang, Dit-Yan Yeung, Wai-Kin Wong, and Wang-chun Woo. Convolutional LSTM network: A machine learning approach for precipitation nowcasting. In NIPS, pages 802-810, 2015.

By generating encoded representations that preserve the spatial resolution of the video frames as described above, the system 400 allows the decoder neural network 430 to condition each pixel that needs to be generated without loss of representational capacity.

The system 400 uses the decoder neural network 430 to generate the next frame from the encoded representation generated by the encoder neural network 420.

In particular, as described above, the next frame generated by the system 400 includes a predetermined number of pixels arranged in a two-dimensional map, with each pixel having a respective color value for each of multiple color channels. For example, the video frame generation system 400 can generate frames that include a red color channel, a green color channel, and a blue color channel. As a different example, the video frame generation system 400 can generate frames that include a cyan color channel, a magenta color channel, a yellow color channel, and a black color channel. The multiple color channels are arranged according to a predetermined channel order, e.g., red, green, and then blue, or blue, red, and then green.

Generally, the video frame generation system 400 generates the color values in the output frame pixel by pixel. That is, the video frame generation system 400 orders the pixels in the next frame according to a channel order and then generates the color values for each pixel in the output frame one by one in order according to the channel order.

For example, the channel order may start at the top left corner of the frame and proceed row by row through the frame, with the last pixel in the channel order being the pixel in the bottom right corner of the frame. In this example, the video frame generation system 400 first generates the color values for the top left corner pixel and then proceeds to the next pixel in the top row of the frame. However, other orderings of the pixels in the frame are possible.

Accordingly, the decoder neural network 430 is a neural network that is configured to, for each color channel of each pixel in the predicted next video frame, receive a decoder input that includes (i) the encoded representation of the temporal sequence of video frames, (ii) color values for any pixels in the predicted next video frame before the pixel in the pixel order, and (iii) color values for the pixel for any color channels before the color channel in the channel order. Thus, if the channel order is red, green, blue, for the color value for the red channel of the k-th pixel in the pixel order, the decoder neural network 430 would be conditioned on (i) the encoded representation and (ii) color values for pixels one through k−1 in the pixel order. For the color value for the blue channel of the k-th pixel in the pixel order, the decoder neural network 430 would be conditioned on (i) the encoded representation, (ii) color values for pixels one through k−1 in the pixel order, and (iii) color values for the red and green channels of the k-th pixel.

The decoder neural network 430 is configured to process the decoder input to generate an output defining a score distribution over multiple possible color values for the color channel of the pixel. For example, the score distribution may include a respective score for each color value in a discrete set of possible color values. For example, the discrete set of possible color values can be the set of integers from zero to two hundred fifty-five, inclusive, with the score distribution including a respective score for each of the integers in the set.

Generally, the decoder neural network 430 includes multiple residual blocks of convolutional neural network layers followed by an output layer, e.g., a softmax output layer, that generates the score distribution.

In particular, the convolutional neural network layers in the decoder neural network 430 are masked convolutional layers. That is, each convolutional neural network layer is configured to apply a convolution that is masked such that the score distribution for a given color channel for a given pixel is only generated based on the encoded representation and (i) pixels in the next frame that are before the pixel in the pixel order and (ii) color values for the pixel for color channels before the given color channel in the channel order.

The video frame generation system 400 can implement this masking in any of a variety of ways. For example, each convolutional layer can have a kernel with the corresponding weights zeroed out.

An example of a masked convolutional decoder can be the neural networks described above with reference to FIGS. 1-3, after being adapted to take the decoder input as input.

In some implementations, the decoder input for a given color channel for a given pixel is a depth concatenation of the encoded representation and a current next frame that includes only the color values that have already been generated, i.e., color values for the pixels in the next frame that are before the pixel in the pixel order and the color values for the pixel for color channels before the given color channel in the channel order.

In some other implementations, the decoder neural network 430 separately applies one or more convolutions to the encoded representation, the current next frame, or both, and then sums the resulting tensors before processing the summed tensor through the masked convolutional layers and the output layer.

The system 400 can autoregressively generate the next frame pixel by pixel by iteratively providing decoder inputs to the decoder neural network 430 in accordance with the pixel order and the color channel order and, for each color channel of each pixel, determining the color value for the color channel by sampling from the score distribution generated by the decoder neural network for the pixel, e.g., by sampling a color value from the possible color values in accordance with the scores in the score distribution so that each possible color value is sampled with a likelihood that is defined by the score for the pixel or by selecting a highest-scoring color value.

For example, when generating the color value for the first color channel in the channel order of a next pixel 442 in the output frame 452, the decoder neural network 430 can process a decoder input that includes the encoded representation 422 and a current next frame 440. As shown in FIG. 4, the shaded portion of the current next frame 440 denotes pixels for which color values have already been generated by the video frame generation system 400, while the unshaded portion of the current next frame 440 denotes pixels for which color values have not already been generated.

In the example of FIG. 4, the decoder neural network 430 processes the decoder input that includes the encoded representation 422 and a current next frame 440 to generate a score distribution 446 for the first color channel in the channel order of the next pixel 442. Once the value for the first color channel in the channel order of the next pixel 442 has been generated, the system 400 can generate a new decoder input and provide the new decoder input to the decoder neural network 430 to generate the color value for the next color channel in the channel order of the next pixel 442, and so on until the entire next frame 452 has been generated.

By conditioning the decoder neural network 430 in this manner and generating the new frame as described above, the system 400 can generate new frames that do not have artifacts, e.g., blurring of video continuations, that are present in video frames predicted by other systems that do not condition color values in the manner, e.g., that generate each pixel in the next frame independent of each other pixel.

In some implementations, the input video frames in the temporal sequence are video frames captured of an environment being interacted with by a robotic agent. For example, the video frames can be frames from a video captured by the robotic agent, i.e., by a camera attached to the robotic agent. In these cases, the system 400 can also receive, for each of the video frames, a respective action vector defining an action to be performed by the robotic agent when the environment is in the state characterized by the video frame and, optionally, a state vector characterizing the state of the robotic agent when the environment is in the state. For example, the action vectors can be desired positions of joints of the robotic agent or modifications to be made to current positions of joints of the robotic agent. When received, the state vectors can characterize the current positions of the joints of the robotic agent.

In these implementations, the system 400 uses the action vectors when predicting the next frame. In particular, when generating a next frame, the system 400 can condition the decoder neural network 430 on an action vector defining an action to be performed by the robotic agent to reach the state characterized by the next frame from the state characterized by the last frame in the input sequence. To condition the decoder neural network 430 on an action vector, the system 400 can apply a transformation to the action vector, e.g., a 1×1 convolution, to generate a feature vector and then condition the activation functions of some or all of the convolutional layers in the decoder neural network 430 on the feature vector, i.e., so that the output of the activation function depends both on the feature vector and the output of the convolution performed by the convolutional layer. An example technique for conditioning an activation function on a feature vector is described in more detail above with reference to FIGS. 1-3.

In some implementations, the system 400 also conditions the convolutional encoder 410 on, for each input frame, the action vector for the input frame and, optionally, the state vector for the input frame. The system 400 can perform this conditioning in the same manner as described above for the decoder neural network 430.

By conditioning the generation of the next frame on action vectors, the system 400 can more effectively model the future behavior of the environment to account for planned actions and more accurately predict the next frame.

Figure 5:
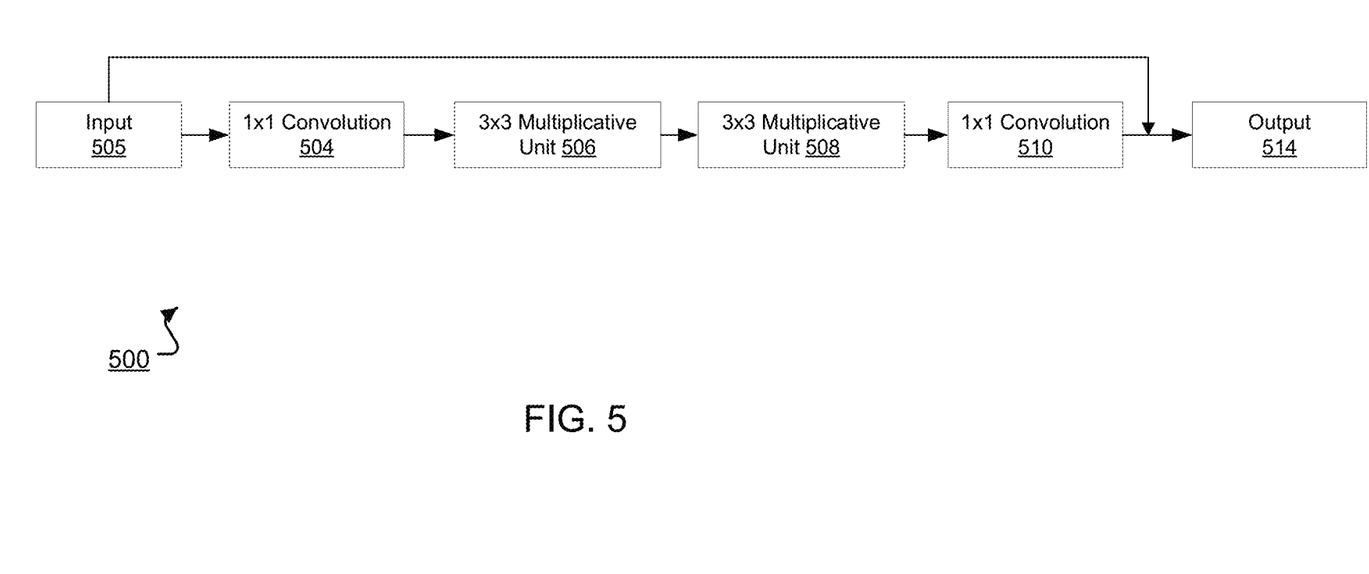
FIG. 5 shows an example residual multiplicative block.

FIG. 5 shows an example architecture of a residual multiplicative block 500 of convolutional neural network layers. For example, the block 500 can be one of the residual multiplicative blocks in the convolutional encoder sub-neural network 410 of FIG. 4.

In particular, the block 500 receives a block input 502 that has dimensions N×M×2c and generates a block output 512 that also has dimensions N×M×2c. For example, depending on the architecture of the convolutional encoder, the block input 502 can be the output generated by the previous residual block, the input frame, or an output of a different kind of layer within the convolutional encoder. The block 500 can provide the block output 512 as input to another block within the convolutional encoder or as the convolved representation for the input frame.

The block 500 applies a 1×1 convolution 504 to the block input 502 to generate an N×M×c tensor, i.e., the 1×1 convolution 504 reduces the number of channels in the input from 2c to c but preserves the spatial dimensionality of the block input.

The block 500 then applies two 3×3 multiplicative units 506 and 508 to the N×M×c tensor. Each block multiplicative unit 506, 508 is configured to process an N×M×c input tensor to generate an N×M×c output tensor.

In particular, each multiplicative unit passes the block input through four convolutional layers to create an update and three gates. When the unit is a 3×3 multiplicative unit, each of the four convolutional layers are 3×3 convolutional layers. The multiplicative unit then combines the gates, the block input, and the update to generate the block output tensor. In particular, the multiplicative unit can perform the following operations on a block input h to generate the block output MU(h):

$$g_1 = \sigma(conv_1(h)),$$

$$g_2 = \sigma(conv_2(h)),$$

$$g_3 = \sigma(conv_3(h)),$$

$$u = \tanh(conv_4(h)), \text{ and}$$

$$MU(h) = g_1 * \tanh(g_2 * h + g_3 * u),$$

where $\sigma$ is the sigmoid non-linearity, each conv is a convolutional layer, tanh is the inverse tangent non-linearity, and * denotes element-wise multiplication.

The block 500 then applies a 1×1 convolution 510 to the output of the multiplicative units to generate an N×M×2c tensor, i.e., the 1×1 convolution 510 projects the N×M×c feature map that is the output of the multiplicative unit 508 back to 2c channels.

Because the block 500 is a residual block, the block 500 then adds the block input 502 and the output of the 1×1 convolution 510 to generate the block output 512.

In some implementations, to increase the receptive field without overly increasing the computational complexity of the system, the convolutional layers in the multiplicative units within the block 500 are dilated convolutional layers. Generally, having a large receptive field helps the model to capture the motion of larger objects in the video sequence.

In general, dilated convolutional architectures have the effect of increasing the receptive field size of neurons in a convolutional network, allowing longer range interactions between neurons than would be feasible without dilation.

In some cases, each convolutional layer within a given block has the same dilation, but the dilation doubles from one block to the next up to a chosen maximum size, and then repeats. For example, one architecture of the convolutional encoder uses two repetitions of the dilation scheme [1, 2, 4, 8], for a total of 8 residual multiplicative blocks.

Figure 6:
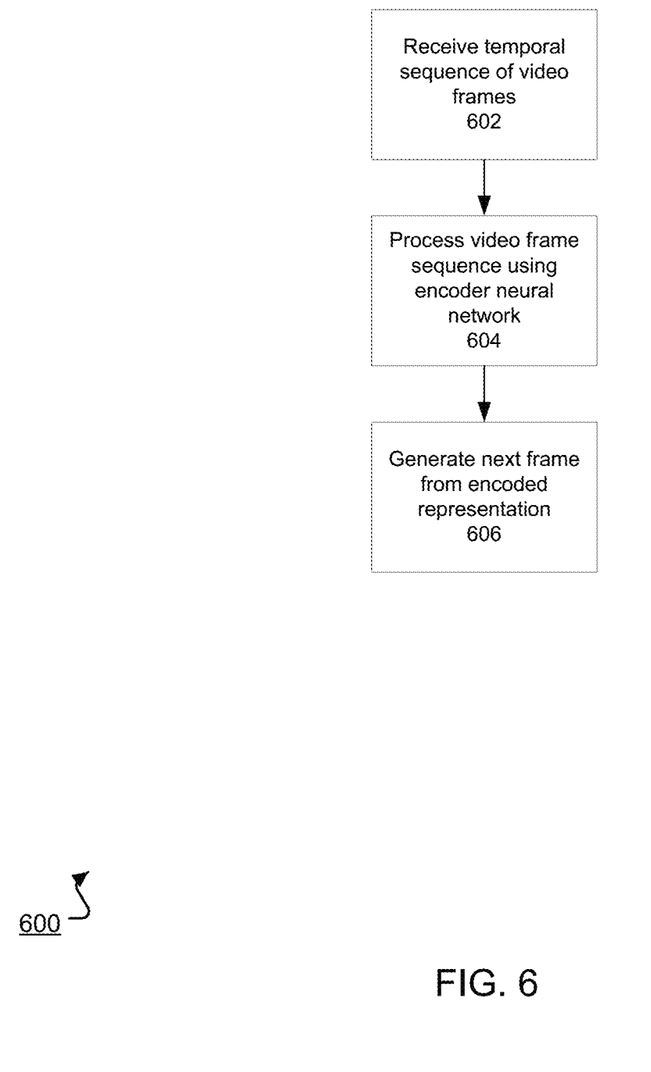
FIG. 6 is a flow diagram of an example process for generating a next frame in a temporal sequence of video frames.

FIG. 6 is a flow diagram of an example process 600 for generating a next frame. For convenience, the process 600 will be described as being performed by a system of one or more computers located in one or more locations. For example, a video frame generation system, e.g., the video frame generation system 400 of FIG. 4, appropriately programmed, can perform the process 600.

The system receives a temporal sequence of video frames (step 602).

The system processes the video frame sequence using an encoder neural network to generate an encoded representation of the sequence of video frames (step 604). In particular, as described above, the system first processes each video frame in the sequence using a convolutional encoder sub-neural network to generate a respective convolved representation for each video frame. The system then processes the convolved representations in sequence using a convolutional LSTM sub-neural network to generate the encoded representation of the sequence of video frames. In particular, the encoded representation is the output of the convolutional LSTM sub-neural network after processing the convolved representation for the last video frame in the sequence. As described above, the encoded representation generally preserves the spatial resolution of the video frames.

The system generates a next frame from the encoded representation using a decoder neural network (step 606).

In particular, the system generates the color values for each pixel in the next frame one by one in order according to the pixel order, so that color values for pixels earlier in the pixel order are generated before color values later in the pixel order. Within each pixel, the system generates the color values for the color channels of the pixel one by one according to the channel order. In particular, the system generates each color value for each pixel conditioned on (i) the encoded representation, (ii) color values for pixels before the pixel in the pixel order and (iii) color values for the pixel for any color channels before the color channel in the channel order.

Thus, the system iteratively provides decoder inputs to the decoder neural network to cause the decoder neural network to generate a score distribution over the possible color values for the current color channel. The system then selects a color value for the current color channel using the score distribution, e.g., by sampling from the score distribution so that each possible color value is selected with a likelihood that is defined by the score for the possible color value or by selecting the highest-scoring color value. The system can repeat these steps for each color channel of each pixel in the next frame according to the pixel and channel orders to generate color values for each color channel of each pixel in the next frame.

The system can perform the process 600 for input sequences for which the desired output, i.e., the next frame that should be generated by the system for the input sequence, is not known.

The system can also perform the process 600 on input sequences in a set of training data, i.e., a set of input sequences for which the next frame that should be generated by the system is known, in order to train the encoder and decoder neural networks, i.e., to determine trained values for the parameters of the encoder and decoder neural networks. The process 600 can be performed repeatedly on inputs selected from a set of training data as part of a conventional machine learning training technique to train the neural networks, e.g., a stochastic gradient descent with backpropagation through time training technique.

During training, because the output frame that should be generated is known in advance and because all of the frames in the input sequence are known at the outset, the computations performed by the encoder and decoder neural networks can be parallelized and therefore accelerated to reduce the amount of time and computing resources necessary to process a given training neural network input and, therefore, to decrease the time required for training, to improve the performance of the trained neural network, or both.

For example, the system can process each input frame using the convolutional encoder in parallel.

As another example, because the entire output image is available from the beginning of the computation, the system can perform the computations of the decoder neural network in parallel rather than iteratively providing decoder inputs to the decoder neural network. That is, the system can use color values from the known next frame in place of already generated output frame pixel color values. Because the convolutions are masked, the system can generate all of the score distributions in parallel without improperly conditioning the score distribution generated for a given color channel for a given pixel on any color values (i) for color channels after the given color channel in the channel order for the given pixel or (ii) for pixels that are after the given pixel in the pixel order.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them.

Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method of generating an output image comprising a plurality of pixels arranged in a two-dimensional map, each pixel having a respective value for each of one or more channels, and wherein the method comprises:
   receiving a neural network input by a neural network system;
   processing the neural network input using one or more initial neural network layers of the neural network system to generate a respective portion of an alternative representation of the neural network input corresponding to each of the one or more channels for each pixel in the plurality of pixels included in the output image; and
   for each of the one or more channels for each pixel in the plurality of pixels included in the output image:
      processing the respective portion of the alternative representation using one or more output neural network layers to generate a respective score distribution over a discrete set of possible values for the channel, wherein the respective score distribution comprises a score for each of the possible values in the discrete set; and
      selecting, using the respective score distribution and from the discrete set of possible values for the channel, the respective value for the channel.

2. The computer-implemented method of claim 1, wherein generating the output image comprising the plurality of pixels arranged in the two-dimensional map comprises generating the output image pixel by pixel from a sequence of pixels taken from the output image.

3. The computer-implemented method of claim 2, wherein processing the neural network input using the one or more initial neural network layers comprises applying a mask to outputs of neural network layers in the one or more initial neural network layers such that the respective portion of the alternative representation corresponding to the channel is only generated based on (i) values for pixels before the pixel in the sequence and (ii) values for the pixel for any channels before the channel in an order of channels.

4. The computer-implemented method of claim 3, wherein the one or more initial neural network layers comprise one or more convolutional neural network layers.

5. The computer-implemented method of claim 4, wherein the mask is implemented as a convolutional layer kernel having zero values corresponding to pixels after the pixel in the sequence.

6. The computer-implemented method of claim 4, wherein the one or more initial neural network layers comprise a horizontal stack of convolutional neural network layers and a vertical stack of convolutional neural network layers, wherein, for a given pixel in a given row, the horizontal stack conditions on the values already generated for the given row so far and the vertical stack conditions on all rows above the given row.

7. The computer-implemented method of claim 4, wherein the alternative representation is a feature map generated by a convolutional neural network layer that includes features for each of the one or more channels for each pixel in the plurality of pixels included in the output image.

8. The computer-implemented method of claim 1, wherein the neural network input comprises an image.

9. The computer-implemented method of claim 1, wherein the one or more output neural network layers comprise one or more softmax layers each configured to generate a respective score for each integer value in a set of integer values representing a likelihood that the integer value should be the value of a given channel.

10. A system comprising one or more computers and one or more storage devices storing instructions that, when executed by the one or more computers, cause the one or more computers to perform operations for generating an output image comprising a plurality of pixels arranged in a two-dimensional map, each pixel having a respective value for each of one or more channels, and wherein the operations comprise:

receiving a neural network input by a neural network system;

processing the neural network input using one or more initial neural network layers of the neural network system to generate a respective portion of an alternative representation of the neural network input corresponding to each of the one or more channels for each pixel in the plurality of pixels included in the output image; and for each of the one or more channels for each pixel in the plurality of pixels included in the output image:

processing the respective portion of the alternative representation using one or more output neural network layers to generate a respective score distribution over a discrete set of possible values for the channel, wherein the respective score distribution comprises a score for each of the possible values in the discrete set; and selecting, using the respective score distribution and from the discrete set of possible values for the channel, the respective value for the channel.

11. The system of claim 10, wherein generating the output image comprising the plurality of pixels arranged in the two-dimensional map comprises generating the output image pixel by pixel from a sequence of pixels taken from the output image.

12. The system of claim 11, wherein processing the neural network input using the one or more initial neural network layers comprises applying a mask to outputs of neural network layers in the one or more initial neural network layers such that the respective portion of the alternative representation corresponding to the channel is only generated based on (i) values for pixels before the pixel in the sequence and (ii) values for the pixel for any channels before the channel in an order of channels.

13. The system of claim 12, wherein the one or more initial neural network layers comprise one or more convolutional neural network layers.

14. The system of claim 13, wherein the mask is implemented as a convolutional layer kernel having zero values corresponding to pixels after the pixel in the sequence.

15. The system of claim 13, wherein the one or more initial neural network layers comprise a horizontal stack of convolutional neural network layers and a vertical stack of convolutional neural network layers, wherein, for a given pixel in a given row, the horizontal stack conditions on the values already generated for the given row so far and the vertical stack conditions on all rows above the given row.

16. The system of claim 13, wherein the alternative representation is a feature map generated by a convolutional neural network layer that includes features for each of the one or more channels for each pixel in the plurality of pixels included in the output image.

17. The system of claim 10, wherein the neural network input comprises an image.

18. The system of claim 10, wherein the one or more output neural network layers comprise one or more softmax layers each configured to generate a respective score for each integer value in a set of integer values representing a likelihood that the integer value should be the value of a given channel.

19. One or more non-transitory computer-readable storage media storing instructions that when executed by one or more computers cause the one or more computers to perform operations for generating an output image comprising a plurality of pixels arranged in a two-dimensional map, each pixel having a respective value for each of one or more channels, and wherein the operations comprise:

receiving a neural network input by a neural network system;

processing the neural network input using one or more initial neural network layers of the neural network system to generate a respective portion of an alternative representation of the neural network input corresponding to each of the one or more channels for each pixel in the plurality of pixels included in the output image; and for each of the one or more channels for each pixel in the plurality of pixels included in the output image:

processing the respective portion of the alternative representation using one or more output neural network layers to generate a respective score distribution over a discrete set of possible values for the channel, wherein the respective score distribution comprises a score for each of the possible values in the discrete set; and selecting, using the respective score distribution and from the discrete set of possible values for the channel, the respective value for the channel.

20. The non-transitory computer-readable storage media of claim 19, wherein generating the output image comprising the plurality of pixels arranged in the two-dimensional map comprises generating the output image pixel by pixel from a sequence of pixels taken from the output image.

* * * * *